Sept. 20, 1966 C. M. LADD 3,273,580
SOLUTION CONCENTRATION CONTROL AND MAKE-UP SYSTEM
Filed Jan. 27, 1964 2 Sheets-Sheet 1

INVENTOR.
CHARLES M. LADD
BY
Benjamin W. Colman
ATTORNEY

INVENTOR.
CHARLES M. LADD

BY

ATTORNEY

United States Patent Office 3,273,580
Patented Sept. 20, 1966

3,273,580
SOLUTION CONCENTRATION CONTROL AND
MAKE-UP SYSTEM
Charles M. Ladd, 14180 Garfield Ave.,
Detroit 39, Mich.
Filed Jan. 27, 1964, Ser. No. 340,286
11 Claims. (Cl. 137—93)

This invention relates to a processing solution concentration control and make-up system and more particularly to a system embodying devices and a solution conduit arrangement whereby highly accurate and sensitive controls are responsive to small changes in the electrical resistance of a solution and operate to maintain such solution substantially at a predetermined concentration level, while the processing solution is being constantly monitored.

This application is a continuation-in-part of my copending application Serial No. 234,802 filed November 1, 1962, now abandoned.

The system of this invention has practical and particular application to maintenance of a substantially constant concentration level in the processing solutions of spray washers, soak tanks, phosphate installations, rinse water tanks, and similar devices. The system is designed to operate on a continuous basis for use in industrial production processing operations, and for single or multiple stage systems. Solution resistance is continuously monitored, any significant change in the resistance of the solution being responded to by the automatic infusion of make-up additions from a reservoir tank of highly concentrated solution.

The invention involves a unitary integrated system having devices operable by automatic electrical controls in which an exceptionally high degree of processing solution concentration control is achieved. The devices in the system include a processing solution resistance sensing chamber, a pump and conduit system for bringing processing solution to and through the sensing chamber and delivering such solution back to its source or to a reservoir tank of more highly concentrated make-up solution. Electrical control elements responsive to sensing of the solution resistance provide an automatic continuous means for maintaining the solution concentration at a substantially constant predetermined level.

The invention involves an improvement in cycling the processing solution through a conduit system whereby the solution resistance sensing chamber and controls continuously compare the resistance of the processing solution to that of a standard solution of known predetermined concentration. A further improvement resides in the solution resistance sensing control wherein a pair of sensing probe cells are used, one such cell containing the standard or reference solution of predetermined and known concentration, the other cell containing the processing solution whose concentration is to be modified by make-up solution from the reservoir tank. The first improvement is effected by passing all solutions, both processing solution and make-up solution through the solution resistance sensing chamber, and the second improvement results from substantially equalizing the temperatures of the standard solution in its cell and the actuating solution—be it processing or make-up solution or a combination of both—in the second cell of the sensing chamber.

It has been found that upon a variance in solution temperatures, i.e. the temperature of the standard solution and the temperature of the actuating solution when sensed for their respective electrical resistances, a disparity in resistance ratings can be occasioned solely by such temperature difference. When the concentrations of these solutions were determined by means other than by measurement of their electrical resistances, they were found to be substantially different from the readings based on electrical measurement. It was finally deduced that such differences resulted from temperature differences in the two solutions, i.e. the temperatures of the standard solution and the acting solution, at the time the resistances were taken and rated.

A principal advantage of the invention resides in the fact that no adjustments for temperatures, solution concentrations, or kinds of chemicals (of higher or lower conductivity), are required. A second and principal advantage is that the system is so organized that highly concentrated make-up solution makes no contact with either a pump or a valve. In industrial processing, this advantage is important, for highly concentrated solution can precipitate solid material, or undissolved raw concentrate can deposit and settle in the finely adjusted and constructed pump and valve forming parts of the system. Upon such precipitation or deposit, pumps stop pumping and valves stop operating, for the deposits usually solidify, harden and gum up the functioning of these components. A third advantage is that the feed portion of the system is controlled entirely by a single solenoid valve, thereby reducing not only the number of components generally used in prior art controls but also avoiding the many operating problems occasioned upon failure of such controls individually or collectively.

The instant invention provides, as a primary object, the system of passing actuating solution from a processing tank into a sensing chamber in which both a reference solution cell and an actuating solution cell are located, and in which actuating solution is circulated around the reference cell whereby to bring the temperature of the reference solution to substantially the temperature of the actuating solution. Another object is to pass the actuating solution through its cell for resistance sensing after circulating it around the reference cell. A further object is to bring the solutions in the two cells, within which the solutions are being constantly rated for their electrical resistance, to substantially equal temperatures. Yet another object is to provide a resistance sensing chamber for a reference solution and an actuating solution whereby the two solutions can be compared and rated electrically without requiring an adjustment for solution temperature differentials. A further object of the invention is to pass both processing tank solution and make-up solution, when required, through the sensing chamber before pumping it on the processing tank, whereby the solution being fed to the processing tank is constantly rated through a Wheatstone bridge circuit in respect to the resistance of the reference solution. Still another object is to provide an integrated unitary system including a solution resistance sensing chamber, a pump, and conduit system coupling the sensing chamber and a make-up solution reservoir tank for delivery of actuating solution to a solution processing tank.

These and additional objects of the invention and features of the inventive system will become more readily apparent from the description given below, in which a representative embodiment of the invention is described and illustrated. Reference is here made to the drawings annexed hereto, forming an integral part of this specification, and in which FIGURE 1 is an elevational view, partially in section, of the devices comprising the inventive system, as a representative embodiment thereof.

Structural components

Figure 1:
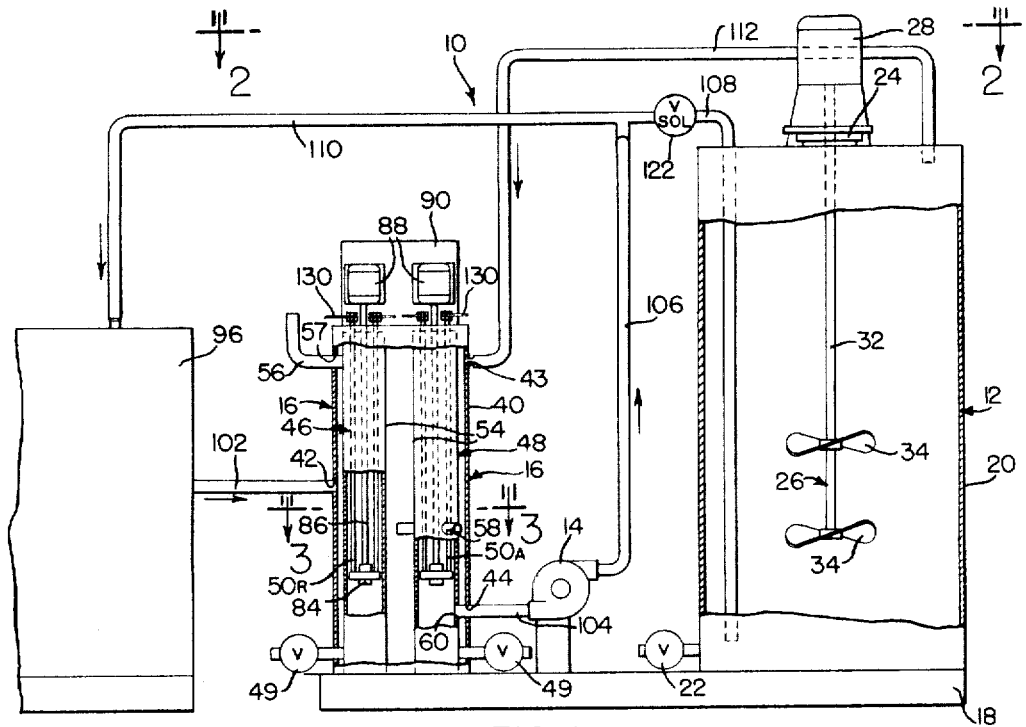
Figure 2:
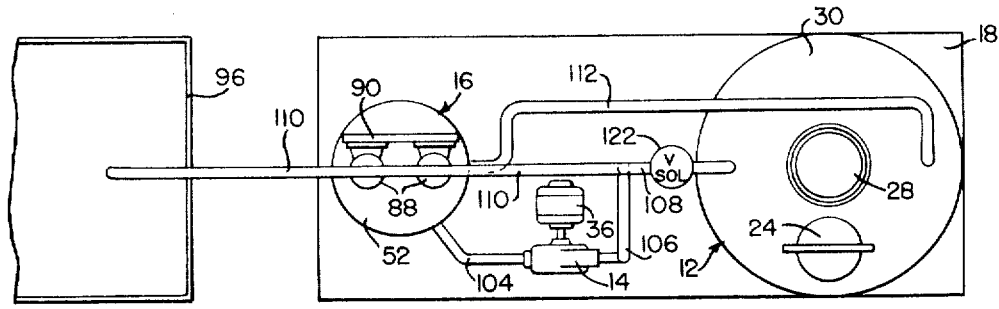
FIGURE 2 is a top plan view of the devices shown in FIGURE 1 and taken substantially on the line 2—2 of FIGURE 1.
Figure 3:
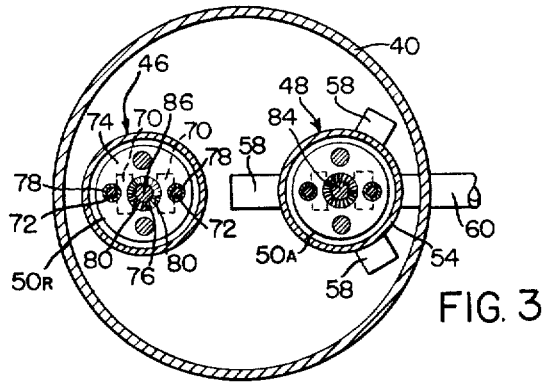
FIGURE 3 is a horizontal sectional view through the sensing chamber taken substantially on the line 3—3 of FIGURE 1.
Figure 4:
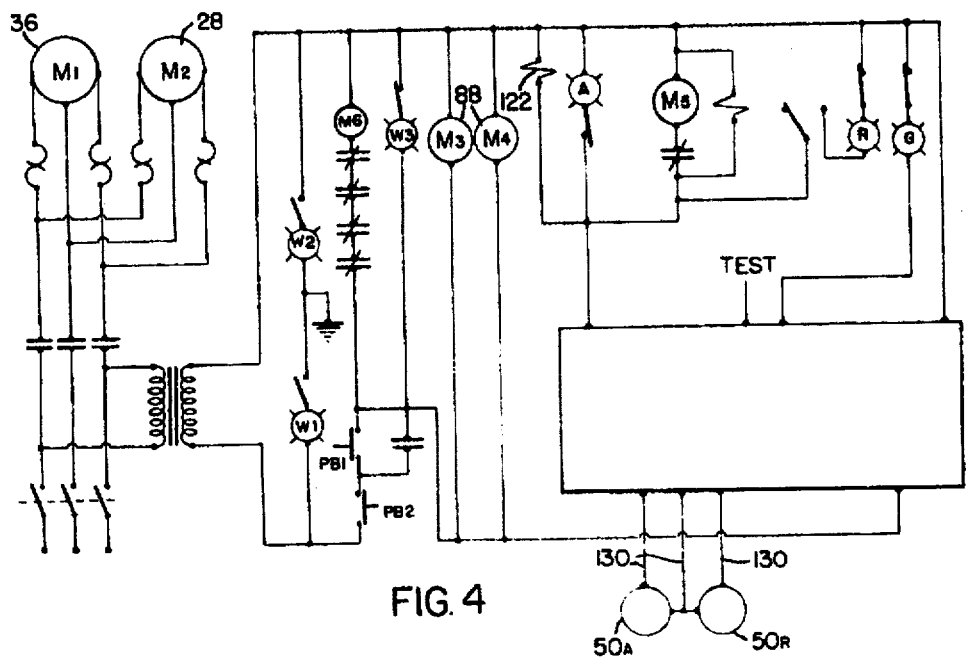
FIGURES 4 and 5 are wiring diagrams of electrical and electronic control devices respectively for the system illustrated in FIGURES 1 to 3 inclusive.
Figure 5:
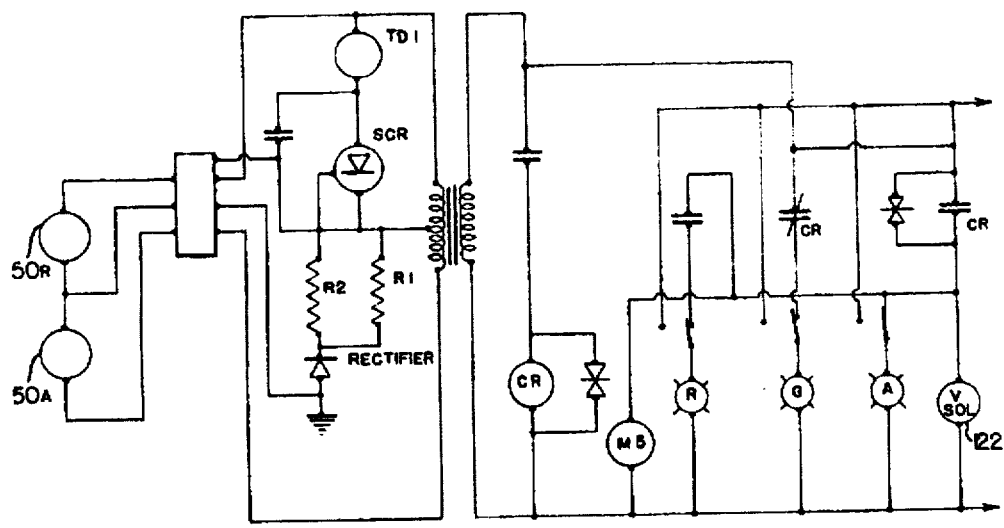

As shown more particularly in FIGURES 1 through 3, inclusive, the solution concentration control and make-up structure 10 comprises a reservoir solution make-up tank 12, a centrifugal pump 14, a solution resistance sensing chamber 16, all arranged on and secured to a platform 18 as a unitary structure, together with a control panel (not shown) embodying the elements illustrated in the wiring diagram of FIGURE 4, and FIGURE 5.

The reservoir tank 12 comprises a vessel 20 having a drain 22, a concentrate supply port fitted with a cap 24 through which powdered or liquid concentrate can be introduced into the vessel 20, and an agitator 26, for dry additives, driven by motor 28 mounted upon the cover or dome 30 of the vessel. The agitator 26, for use primarily to accelerate the dissolution of dry concentrate additives in the tank, comprises a shaft 32 and one or more propellor blades 34 secured to the shaft which is coupled by a suitable member to the drive shaft of motor 28. The vessel 20 is a closed and sealed unit, the solution therein being under pressure during the feed operation of the system.

The centrifugal pump 14 of conventional construction is driven by a motor 36, and should have a capacity adequate to satisfy the need of each particular processing solution tank being serviced. Although a centrifugal pump is the preferred pump construction, it sould be understood that equivalent pump structures can also be used including rotary pumps and others. It should also be understood that the pump ought not to be of a capacity nor have an output rate such that the actuating solution drawn into the sensing chamber is removed at a speed that cannot be sensed for its electrical resistance or cannot perform its function of equalizing the temperature of the reference solution with its own temperature.

The solution resistance sensing chamber 16 comprises a vessel 40 closed at its bottom end and having lateral inlet ports 42 and 43 thereinto, an outlet port 44, a reference solution cell 46, an actuating solution cell 48, and a solution resistance sensing probe unit 50R and 50A, respectively, in each such cell. The vessel 40 is provided with a removable cover 52 adapted to closely fit upon the top of the vessel and close it against admission of deleterious matter. As will be described below, the sensing chamber 16 functions as a heat exchanger whereby the temperatures of the solutions in each of the cells 46 and 48 and in circulation about such cells are substantially equalized.

The reference solution and actuating solution cells 46 and 48 respectively, are substantially identical. Each cell comprises a vessel 54 closed at its bottom end and having an elongated tubular body open at its top end which terminates closely adjacent the cover 52. The reference solution cell 46 is provided with an inlet tube 56 adjacent the upper end of its vessel, and entering through vessel port 57, but it has no outlet. The actuating solution cell 48 has a number of inlets 58 disposed somewhat below the level of the inlet port 42 and about the vessel 54. The inlets 58 terminate within the sensing chamber vessel 40 so that all solutions introduced thereinto pass through such inlets, the actuating solution cell 48, and through cell outlet 60 to pump 14. A manual drain valve 49 is attached to each cell vessel 54 adjacent its bottom end.

A cell of the sensing chamber 16 including the probe unit 50 is also described in my copending patent application Serial No. 340,444 filed of even date, January 27, 1964, and is claimed in such copending application.

The solution resistance sensing probe units 50 each comprises a pair of metallic electrically conductive electrode plates 70, 70 each welded to or otherwise electrically connected to an electrode rod or conductor 72, a non-conductive pad member 74 embodying and supporting the plates 70, 70 and provided with a central venturi port or opening 76 therethrough and an insulating coating 78 over the electrode rods 72 and major portions of the plates 70, 70.

A brush unit 84 is secured to the lower end of a shaft 86 driven by motor 88 mounted on a plate 90 attached to the vessel cover 52. The non-conductive bristles of the brush, resistant to the solution in the cell, provide a continuous agitation and flow of solution through the port 76. The bristle portion of the brush unit rotates within the venturi port and into engagement with the exposed plate surfaces 80, 80 so as to clean them of any possible electrical resistance-forming deposit during operation of the sensing chamber 16.

The reservoir tank 12, the pump 14 and the sensing chamber 16 are interconnected to each other and to the processing solution tank 96 by the following conduit system. Leading from the processing solution tank 96 to the sensing chamber vessel 40 at inlet port 42 is a processing solution conduit 102. A conduit 104 takes actuating solution from the cell 48 at outlet 60 through the chamber vessel outlet 44 to the pump unit 14, from which a conduit 106 conducts such solution to an interconnected T-joint with a conduit having one branch 108 (right) leading into reservoir tank 12 and a second branch 110 (left) leading to the processing solution tank 96. A reservoir tank discharge conduit 112 conducts make-up solution from the tank 12 to the sensing chamber vessel 40 at its second inlet port 43. A single solenoid valve 122 is located in the conduit 108 adjacent the T-joint. This valve constitutes the only control valve in the system.

The orifice of the conduit 112 at the end of the line at vessel entry 43 is appreciably smaller than the orifice of the conduit branch 110 at the end of its line at its entry into the tank 96. Thus, under pressure by the pump 14 solution in the conduit 106 will flow more readily into tank 96 than will be forced from reservoir tank 12 into the sensing chamber 16 through conduit 112 when solenoid valve 122 is open.

Controls

The function of the controls is to provide an automatic response in the system to a demand for raising the concentration level of actuating solution upon a signal from the sensing chamber. The resistance of the actuating solution flowing within the chamber vessel 40 is rated in the actuating solution cell 48 by the probe unit 50A in respect to and comparison with the resistance of the reference solution in cell 46. Such matching, through a Wheatstone bridge circuit, is signalled to show that the actuating solution concentration is normal, i.e. substantially matches the concentration of the reference solution, or requires make-up solution from the reservoir tank 12, or that the reservoir tank requires recharging.

The control system operates on a 110 volt, 60-cycle per second alternating current through a Wheatstone bridge circuit that compares the resistance of the standard solution (of known predetermined concentration) in the reference cell 46 with the resistance of the actuating solution in the cell 48. When the concentrations of both solutions are substantially equal and at the same temperature, their resistances in the bridge circuit will also be substantially equal, and the output voltage differential will be at a minimum, i.e. substantially zero, so that the feed solenoid valve 122 cannot be energized.

When the concentration of the actuating solution decreases due to consumption of processing solution in the tank 96, or increases by addition of concentrated make-up solution from the reservoir tank 12, whereby the bridge resistance of the actuating solution increases or decreases, the output voltage of the circuit increases or decreases in direct proportion. The solenoid feed valve 122 in the conduit branch 108 is designed to operate only upon an increased actuating solution resistance when compared to the resistance of the standard solution.

Since temperature affects the resistance of a solution in a manner inverse to that of its concentration, i.e. a higher temperature produces a lowered resistance, as does a higher concentration, and a lower temperature results in a higher resistance, as with a lower concentration, it is most desirable to eliminate temperature variation effects in order that the concentration control be efficient. The control system of this invention therefore embodies a temperature balancing mechanism in the heat exchanger arrangement. By having the reference cell 46 located within the sensing chamber 16 whereby actuating solution from the processing tank 96 and/or from the reservoir tank 12 is freely circulated about the reference cell 46, the temperature of the reference solution is maintained substantially equal to that of the actuating solution. By equalizing the temperatures of both solutions in the sensing chamber, the temperature effects are balanced out, and the voltage differential is at a minimum insofar as such temperature effects are concerned. This leaves the resistances of the two solutions as the primary source of voltage differential. Since the resistance is inversely proportional to the solution concentration, a rise in resistance for the actuating solution results in a voltage differential sufficient to actuate and open the solenoid valve 122. Upon a drop in the voltage differential, occasioned by a decrease in the resistance of the actuating solution in comparison to that of the reference solution, the solenoid valve will close. According to this system, feeding of make-up solution to the sensing chamber continues until the solenoid valve closes.

The representative control system illustrated in FIGURES 4 and 5 may be simplified, amplified or modified to suit the requirements of a particular application. The lights $W_1$ and $W_2$ signal a ground in circuit; $W_3$ signals that the system is on and in operation; lamp A indicates that the feed circuit is on, i.e. make-up solution is being discharged from reservoir tank 12 to the sensing chamber 16; lamp G signals that the valve 122 is closed; lamp R that the reservoir tank requires recharging. PB1 and PB2 represent start and stop push button switches, respectively. The timer motor M5 signals the R lamp when the time delay period has been exceeded. The starter M6 operates the circuit devices. In the diagram of FIGURE 5, TD1 represents a time delay device, CR control relays, SCR a controlled rectifier, and R1 and R2 resistance units.

*Operation*

The system is put in operation by passing current to the pump motor 36, the driving brush motors 88, the solenoid valve 122, and the agitator motor 28, which operate continuously until stopped. Upon actuation of the pump motor 36, solution flows from the processing tank 96 into the chamber vessel 40 surrounding and circulating about the reference cell 46 and actuating cell 48. This reference cell contains a solution of predetermined concentration having a relatively constant resistance. Since the cell is maintained in a substantially closed condition, very little evaporation occurs.

When electric current is passed to the motors, it is also passed through the conductors 130 to the electrode rods 72 and to the electrode plates 70, 70. With a conductive solution in each of the cells 46 and 48, current passes through such solutions and between the plate surfaces 80, 80 in the bore 76 of the pad member 74. Brushes 84 rotatably driven by motors 88 sweep and clean the plate surfaces 80, 80 in the bore of the pad member, keeping them free of deposits that might add resistance to the current flow between the electrode plates, at the same time forcing solution through the bore 76.

A normal operating condition for the system is one in which the processing solution concentration is substantially that of the reference solution. Since the temperature of the reference solution, under agitation by its brush 84, is moving rapidly to equilibrium with the temperature of the actuating solution circulating around the reference cell 46, the output voltage differential is at a minimum. The normal position of solenoid valve 122 is closed, so that all solution issuing from the actuating cell 48 is pumped through the conduit branch 110 back to the processing tank 96. No make-up solution is being drawn from the reservoir tank 12.

The pump 14 takes solution through the sensing chamber 16 and the actuating cell 48 continuously, the solution resistances of both cells 46 and 48 being rated continuously. Since the actuating solution drawn by pump 14 is in continuous motion and flow, it passes through the venturi port 76 of the probe unit 50A at a relatively high velocity with an assist from the brush 84, and the rating of its resistance effects an immediate response upon an increase or decrease in such resistance.

When the resistance of actuating solution sensed by its probe 50A goes above a pre-established level, the solenoid valve 122 is opened and some of the actuating solution passes into the reservoir tank vessel 20, while some of it goes into conduit branch 110 to the processing tank 96.

The orifice in conduit 112 at the chamber vessel entry 43 is appreciably less in area than the orifice in conduit 110 at the processing tank 96. Since the conduit area in the valve 122 is greater than that of either of these orifices, a pressure head is built up in the reservoir tank 12 by the pump 14. The reservoir tank vessel 20 is charged with actuating and concentrated solutions until the pressure built up in the tank discharges make-up solution into conduit 112 to the sensing chamber vessel 40. As actuating solution is being pumped into the reservoir tank, it mixes with the more highly concentrated solution therein to form make-up solution, while the vessel 20 is being pressurized. Upon the probe 50A in cell 48 again sensing a resistance substantially equal to the resistance of the reference solution in cell 46, the output voltage differential drops substantially to zero and the solenoid valve 122 closes, shutting off further flow to the reservoir tank 12.

It will be understood by persons skilled in the art to which the invention pertains that the control devices which can be utilized and employed in actuating and controlling the responses of the structural components will include a wide range of substantially equivalent electrical and electronic devices that do not form a part of the inventive structure hereindisclosed and claimed. Control devices can be selected as desired or required, and such selection will permit operation and control of the operating structure in accordance with a perdetermined magnitude and schedule of operation.

The structural components, reservoir tank 12, sensing chamber 16, and pump 14 are made principally of steel. In view of the generally corrosive nature of processing solutions, it is desirable either to coat the solution contacting surfaces of the several components with a corrosion-resistant coating or layer of material, or to make such devices of stainless steel. The probe units 50A and 50R are made of a non-conductive material, such as plastisol, preferably coated upon copper or stainless conductive rods 72 and stainless plates 70.

Some practical factors that should be given consideration and attention include positioning the sensing chamber so that the top edge of the vessel 40 is a few inches above the normal operating level of the processing solution in its tank 96, positioning the supply line conduit 102 from the tank 96 so that it lies substantially below the normal level of the processing solution, and positioning the feed line conduit 112 and the branch conduit 110 so that they lie substantially above the solution level normally present in the processing tank 96.

Having described the invention in its simplest terms, it will be understood that the features of construction and their organization according to this specification

I claim:

1. In a system for maintaining the concentration of a processing solution substantially at a predetermined level,
   a solution resistance sensing chamber containing a reference cell and an actuating cell,
   a reservoir tank of make-up solution normally at a relatively high level of concentration,
   a supply of said processing solution,
   and pump and conduit means for drawing processing solution from its tank through said sensing chamber and into and through said pump for delivery back to said supply of processing solution and alternatively to said reservoir tank,
   said conduit means conducting said processing solution from its supply into said sensing chamber by gravity,
   said conduit means conducting solution from said pump to said reservoir tank having a normally closed valve therein adapted to open and close upon actuation by means responsive to the electrical resistance of said solution in said actuating cell.

2. In a system for maintaining the concentration of a processing solution substantially at a predetermined level,
   a reservoir tank of make-up solution normally at a relatively high level of concentration,
   a supply of said processing solution,
   a solution resistance sensing chamber containing a reference cell and an actuating cell,
   and pump and conduit means for drawing processing tank solution and make-up solution through said sensing chamber for delivery back to said supply of processing solution and alternatively to said reservoir tank,
   said conduit means conducting solution from said pump to said reservoir tank having a normally closed valve therein adapted to open upon actuation by means responsive to the electrical resistance of said solution in said actuating cell,
   said pump delivering solution from said sensing chamber simultaneously to said supply of processing solution and to said reservoir tank when said valve is open.

3. The structure defined in claim 2, wherein
   said conduit means includes a conduit conducting make-up solution from said reservoir tank to said sensing chamber.

4. The structure defined in claim 3, wherein
   said conduit conducting make-up solution from said reservoir tank to said sensing chamber is provided with an orifice of restricted area,
   said conduit means conducting solution from said pump to said supply of processing solution being provided with an orifice of restricted area,
      said first orifice being substantially smaller in solution delivery area than that of said second orifice,
   whereby the solution in said reservoir tank is put under pressure by the solution delivered thereinto by said pump so as to discharge make-up solution from said reservoir tank to said sensing chamber.

5. The structure defined in claim 2, wherein
   said reservoir tank is maintained in a substantially closed state while said pump delivers solution thereinto.

6. In a system for maintaining the concentration of a processing solution substantially at a predetermined level,
   a reservoir tank of make-up solution,
   a supply of said processing solution,
   a solution resistance sensing chamber containing a reference cell and an actuating cell,
   pump and conduit means adapted to conduct processing solution from its supply into and through said sensing chamber and to deliver solution from said sensing chamber to said supply of processing solution and alternatively to said reservoir tank,
   said pump and conduit means adapted to force solution from said reservoir tank under pressure to said sensing chamber,
      said reference cell containing a solution of known predetermined concentration and being disposed within said sensing chamber in such a manner that said processing solution and make-up solution will circulate and flow about and in intimate contact with said reference cell,
      said actuating cell adapted to receive, contain temporarily and pass on the solution delivered into said sensing chamber and being disposed within said chamber in such a manner that said latter solution circulates and flows about and in intimate contact with said actuating cell before passing into and through said actuating cell,
   whereby the temperatures of the solutions in said reference and actuating cells are substantially equalized.

7. The structure defined in claim 6, wherein
   said reservoir tank is maintained in a substantially closed state while said pump delivers solution thereinto.

8. The structure defined in claim 6, wherein
   said conduit means includes a conduit conducting make-up solution from said reservoir tank to said sensing chamber.

9. The structure defined in claim 8, wherein
   said conduit conducting make-up solution from said reservoir tank to said sensing chamber is provided with an orifice of restricted area,
   said conduit means conducting solution from said pump to said supply of processing solution being provided with an orifice of restricted area,
      said first orifice being substantially smaller in solution delivery area than that of said second orifice,
   whereby the solution in said reservoir tank is put under pressure by the solution delivered thereinto by said pump so as to discharge make-up solution from said reservoir tank to said sensing chamber.

10. In a system for maintaining the concentration of a processing solution substantially at a predetermined level,
    a solution resistance sensing chamber containing a reference cell and an actuating cell,
       said reference cell containing a solution of known predetermined concentration,
       said actuating cell containing temporarily an actuating solution substantially comprising said processing solution,
    said reference cell being disposed within said chamber in such a manner that said actuating solution will circulate and flow about and in intimate contact with said reference cell,
    said actuating cell adapted to receive and pass on said actuating solution and being disposed within said chamber in such a manner that said actuating solution circulates and flows about and in intimate contact with said actuating cell before passing into and through said actuating cell,
       said actuating cell having at least one inlet to pass actuating solution into said cell and an outlet to pass said actuating solution from said cell to a position outside of said sensing chamber.

11. In a system for maintaining the concentration of a processing solution substantially at a predetermined level,
    a solution resistance sensing chamber in combination with electrical control means adapted to sense the electrical resistance of an actuating solution substantially comprising said processing solution in comparison with the electrical resistance of a reference solution of known predetermined concentration, said sensing chamber having a reference cell containing said reference solution disposed within said chamber in such a manner that said actuating solution circulates and flows about and in intimate contact with said reference cell, said sensing chamber having an actuating cell adapted to receive and pass on said actuating solution within said chamber in such a manner that said actuating solution circulates and flows about in intimate contact with said actuating cell, said actuating cell having at least one inlet to pass actuating solution into said cell and an outlet to pass said actuating solution from said cell to a position outside of said sensing chamber.

References Cited by the Examiner
UNITED STATES PATENTS

| | | | |
|---|---|---|---|
| 2,311,532 | 2/1943 | Gershon | 137—88 |
| 2,422,873 | 6/1947 | Wolfner | 324—30 |
| 2,559,090 | 7/1951 | Potter | 137—93 |
| 2,769,072 | 10/1956 | Obershain | 324—30 X |
| 2,819,726 | 1/1958 | Rendel | 137—93 |
| 3,195,551 | 7/1965 | Russell | 137—5 |

M. CARY NELSON, *Primary Examiner.*

S. SCOTT, *Examiner.*